(12) United States Patent
Yalagandula et al.

(10) Patent No.: US 10,110,460 B2
(45) Date of Patent: Oct. 23, 2018

(54) PRIORITY ASSESSMENT OF NETWORK TRAFFIC TO CONSERVE BANDWIDTH GUARANTEES IN A DATA CENTER

(71) Applicant: HEWLETT-PACKARD DEVELOPMENT COMPANY, L.P., Houston, TX (US)

(72) Inventors: Praveen Yalagandula, Palo Alto, CA (US); Lucian Popa, Palo Alto, CA (US); Sujata Banerjee, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 268 days.

(21) Appl. No.: 14/906,941

(22) PCT Filed: Jul. 23, 2013

(86) PCT No.: PCT/US2013/051674
§ 371 (c)(1),
(2) Date: Jan. 22, 2016

(87) PCT Pub. No.: WO2015/012811
PCT Pub. Date: Jan. 29, 2015

(65) Prior Publication Data
US 2016/0156538 A1 Jun. 2, 2016

(51) Int. Cl.
*G06F 15/173* (2006.01)
*H04L 12/26* (2006.01)
(Continued)

(52) U.S. Cl.
CPC ...... *H04L 43/0894* (2013.01); *G06F 9/45533* (2013.01); *G06F 9/45558* (2013.01);
(Continued)

(58) Field of Classification Search
CPC .. G06F 11/30; G06F 9/45533; G06F 9/45558; H04L 41/0896; H04L 41/5019; H04L 43/0894
See application file for complete search history.

(56) References Cited

U.S. PATENT DOCUMENTS 7,724,760 B2   5/2010   Balakrishnan et al.
8,095,675 B2   1/2012   Tripathi et al.
(Continued)

FOREIGN PATENT DOCUMENTS

CN   102262557   11/2011

OTHER PUBLICATIONS

International Search Report and Written Opinion, International Application No. PCT/US2013/051674, dated Apr. 24, 2014, pp. 1-8.
(Continued)

*Primary Examiner* — Mohamed A Wasel
(74) *Attorney, Agent, or Firm* — McDermott Will & Emery (57) ABSTRACT

Example embodiments relate to work conserving bandwidth guarantees using priority, and a method for determining VM-to-VM bandwidth guarantees between a source virtual machine (VM) and at least one destination VM, including a particular VM-toVM bandwidth guarantee between the source VM and a particular destination VM. The method includes monitoring outbound network traffic flow from the source VM to the particular destination VM. The method includes comparing the outbound network traffic flow to the particular VM-to-VM bandwidth guarantee. When the outbound network traffic flow is less than the particular VM-to-VM bandwidth guarantee, packets of the flow are directed according to a first priority. When the outbound network
(Continued)

traffic flow is greater than the particular VM-to-VM bandwidth guarantee, packets of the flow are directed according to a second priority.

13 Claims, 6 Drawing Sheets (51) Int. Cl.
G06F 9/455 (2018.01)
G06F 11/30 (2006.01)
H04L 12/24 (2006.01)
G06F 9/48 (2006.01)
G06F 9/50 (2006.01)
G06F 13/40 (2006.01)
H04L 29/08 (2006.01)

(52) U.S. Cl.
CPC .......... G06F 9/4881 (2013.01); G06F 9/5038 (2013.01); G06F 11/30 (2013.01); G06F 13/4022 (2013.01); H04L 41/0896 (2013.01); H04L 41/5019 (2013.01); H04L 67/1038 (2013.01); *G06F 2009/45595* (2013.01)

(56) References Cited

U.S. PATENT DOCUMENTS

| | | | |
|---|---|---|---|
| 8,165,123 B2 | 4/2012 | Kohzuki et al. | |
| 8,250,586 B2 | 8/2012 | Nelson | |
| 8,341,624 B1 | 12/2012 | Hobbs | |
| 9,378,125 B2* | 6/2016 | Lee | G06F 12/00 |
| 9,571,426 B2* | 2/2017 | Agarwal | H04L 49/9047 |
| 9,794,185 B2* | 10/2017 | Popa | H04L 49/00 |
| 2003/0043741 A1* | 3/2003 | Mukai | H04L 47/10 370/229 |
| 2005/0060421 A1 | 3/2005 | Chowdhary et al. | |
| 2006/0018322 A1* | 1/2006 | Oron | H04L 12/5601 370/395.1 |
| 2008/0046610 A1* | 2/2008 | Tripathi | G06F 9/45558 710/36 |
| 2008/0155537 A1* | 6/2008 | Dinda | G06F 9/4887 718/1 |
| 2009/0024746 A1 | 1/2009 | Welch | |
| 2009/0183180 A1* | 7/2009 | Nelson | G06F 9/45533 719/319 |
| 2010/0232443 A1* | 9/2010 | Pandey | H04L 49/70 370/401 |
| 2010/0318608 A1* | 12/2010 | Huang | G06F 9/4856 709/205 |
| 2011/0296052 A1 | 12/2011 | Guo et al. | |
| 2012/0102190 A1* | 4/2012 | Durham | H04L 41/0823 709/224 |
| 2012/0155264 A1 | 6/2012 | Sharma et al. | |
| 2013/0077486 A1 | 3/2013 | Keith | |
| 2013/0304903 A1* | 11/2013 | Mick | H04L 43/0817 709/224 |
| 2014/0258535 A1* | 9/2014 | Zhang | H04L 41/0806 709/226 |
| 2014/0281030 A1* | 9/2014 | Cui | H04L 43/026 709/244 |
| 2014/0344440 A1* | 11/2014 | Dutta | H04L 41/0823 709/224 |
| 2015/0134830 A1* | 5/2015 | Popa | H04L 49/00 709/226 |

OTHER PUBLICATIONS

Vincent D. Park et al., "Evaluation of OpenROUTE Networks Bandwidth Reservation System adn Priority Queueing," Aug. 31, 1999, pp. 1-27, Naval Research Laboratory, Washington, DC, USA.

* cited by examiner

PRIORITY ASSESSMENT OF NETWORK TRAFFIC TO CONSERVE BANDWIDTH GUARANTEES IN A DATA CENTER

BACKGROUND

In a cloud computing environment, a data center may include multiple networked computing devices. Some or all of the computing devices (i.e., hosts) may each run a number of virtual machines (VMs). Tenants may reserve one or more VMs, for example, to execute applications. A tenant may be a user, organization or the like that owns (e.g., pays for) the right to use the VMs. A particular tenant's VMs may be consolidated on a single computing device/host or distributed across multiple computing devices/hosts in the data center. A tenant may configure its VMs to communicate between themselves, for example, to provide a unified service of the tenant. A tenant's VM(s) may communicate with VMs of other tenants as well. A tenant may desire to know minimum communication specifications (e.g., bandwidth guarantees) between its VMs, and with VMs of other tenants, such that the tenant may determine lower bounds on the performance of the tenant's applications and/or service.

BRIEF DESCRIPTION OF THE DRAWINGS

The following detailed description references the drawings, wherein.

DETAILED DESCRIPTION

As mentioned above, a tenant may desire to know minimum communication specifications (e.g., bandwidth guarantees) between its VMs such that the tenant may determine lower bounds on the performance of the tenant's applications and/or service. Various cloud providers cannot accurately offer such bandwidth guarantees. The lack of such bandwidth guarantee information prevents tenants from determining lower bounds on application and/or service performance. The lack of such bandwidth guarantee information may also prevent tenants from transferring enterprise applications to clouds because many enterprise applications require predictable performance guarantees.

Various solutions that may offer bandwidth guarantees also waste bandwidth capacity. For example, if a first tenant is not using its full bandwidth guarantee during a particular period, then the spare bandwidth capacity goes to waste, e.g., a second tenant with high demand cannot temporarily use the first tenant's spare bandwidth. Various other solutions that may attempt to provision spare bandwidth capacity are inefficient in fully utilizing the spare bandwidth. For example, some solutions are conservative when allowing a VM to send network traffic at a rate higher than its minimum bandwidth guarantees, e.g., in order to avoid packet drops due to congestion, e.g., at hardware switches. This conservative behavior leads to wastage of network bandwidth.

Various other solutions may provision spare bandwidth in a network by utilizing multiple queues. However, these solutions are not aimed at providing work conserving bandwidth guarantees, where the bandwidth for communication between two particular VMs can exceed a minimum bandwidth guarantee associated with the two VMs by utilizing spare bandwidth in the network, e.g., spare bandwidth which is available because other VM pairs in the network are not using all the bandwidth allotted to them by their bandwidth guarantees. Instead, these solutions are simply aimed at implementing different service levels or priorities for different tenants, applications, services, types of packets, etc. For example, a high priority queue may handle traffic for a first tenant, application, service, type of packet, etc., and a lower priority queue may handle traffic for a second tenant, application, service, etc. For these solutions, particular tenants, applications, services, types of packets, etc. are statically associated with specific hardware queues. Additionally, for these solutions, tenants, applications, services, types of packets, etc. are pre-designated as having a particular importance, priority or service level, and that pre-designation determines which queue is used for the tenants, applications, services, types of packets, etc.

The present disclosure describes work conserving bandwidth guarantees using priority. The present disclosure describes a solution that allows tenants (e.g., for particular VM-to-VM pairs) to send traffic at a higher rate than a particular bandwidth guarantee, for example, when other tenants and/or VM-to-VM pairs are not using their full bandwidth guarantees. The solution may be implemented using two or more priority queues, e.g., in at least one hardware switch that connects multiple host computing devices. The solution may also use at least one flow manager module, for example, located in a hypervisor or in the virtual machines of a host computing device. The flow manager module may monitor outbound network traffic flows from a source VM to destination VMs; and for a particular VM-to-VM pair, may compare the flow to a bandwidth guarantee for the VM-to-VM pair. The flow manager module may direct (e.g., route and/or tag) packets of the flow according to a first priority or a second priority based on whether the flow is greater than the bandwidth guarantee. Directing packets of the flow according to the first priority or second priority may cause the packets to be placed into a first priority queue or a second priority queue, e.g., of a hardware switch. Thus, traffic that abides by bandwidth guarantees may be assigned to higher priority queues, while "opportunistic traffic" (i.e., work conserving traffic) that exceeds bandwidth guarantees may be assigned to lower priority queues. In this way, when the traffic over a first VM pair with a bandwidth guarantee does not fully utilize the guarantee, a second VM pair may opportunistically utilize this spare bandwidth to send traffic that exceeds a bandwidth guarantee of the second pair.

The present disclosure may provide benefits over various other solutions. First, the present disclosure provides tenants with minimum bandwidth guarantees between VMs, which allows tenants to determine lower bounds on application and/or service performance, and may also allow tenants to transfer enterprise applications to clouds. Additionally, the present disclosure may provision spare bandwidth in a network more efficiently than various other solutions that waste bandwidth capacity. The present disclosure may also utilize hardware support (e.g., priority queues in hardware switches) which may simplify the solution implemented in the host computing devices. Accordingly, the host computing devices may implement less complex algorithms which may lead to lower overhead and less CPU utilization in the hosts. Still, the present disclosure may utilize commodity (e.g., off-the-shelf) switches, which makes the solution practical and inexpensive.

Throughout this disclosure, the term "work conservation," "work conserving" or the like may refer to the goal of utilizing spare bandwidth capacity in a network such that as little bandwidth capacity as possible is wasted. The term "link" may refer to a single connection or a single communication component (e.g., a cable, wire, direct wireless connection, etc.) between two computer components. The term "path" (e.g., as in a network path) may refer to a route (e.g., a physical route) that information may travel through in a network, where the path may pass through a plurality of connections, network interfaces, hubs, routers, switches and the like, e.g., from a source to a destination. The term "virtual path" may refer to a logical route that runs through a physical path where other logical routes run through the same physical path. The term "pair" (e.g., as in VM-to-VM pair) may refer to the communications between two computing modules (e.g., two virtual machines). A particular VM-to-VM pair, for example, may refer to all data that travels from one computing module to the other. Data that travels in one direction (e.g., from a first module to a second module) may be, in some instances, considered as a different pair from data that travels in the opposite direction (e.g., from the second module to the first). Data for a pair may travel across one path or multiple paths, and the path(s) may change over time. Thus, a particular VM-to-VM pair may be unique in a network; however multiple paths may carry data for the pair. Likewise, a particular path may carry data for multiple VM-to-VM pairs. In some situations, a pair may be used as a generalized term to refer to communications between a VM and a collection of VMs or communications between a VM and a tenant. The term "flow" (as in network flow) may refer to an aggregation and/or sequence of packets between a source and a destination in a network. Examples of flows include Transmission Control Protocol ("TCP") packets between two VMs, User Datagram Protocol ("UDP") packets between two VMs, or any other aggregation or collection of packets transmitted between a source and a destination. In some situations, a particular flow may be related to a particular purpose (e.g., a particular application, service, module or the like). The term "traffic" may refer to packets or flows that travel through a point (e.g., network interface, hub, router, switch and the like) in a network, where the packets or flows may be traveling from more than one source and/or to more than one destination.

Figure 1:
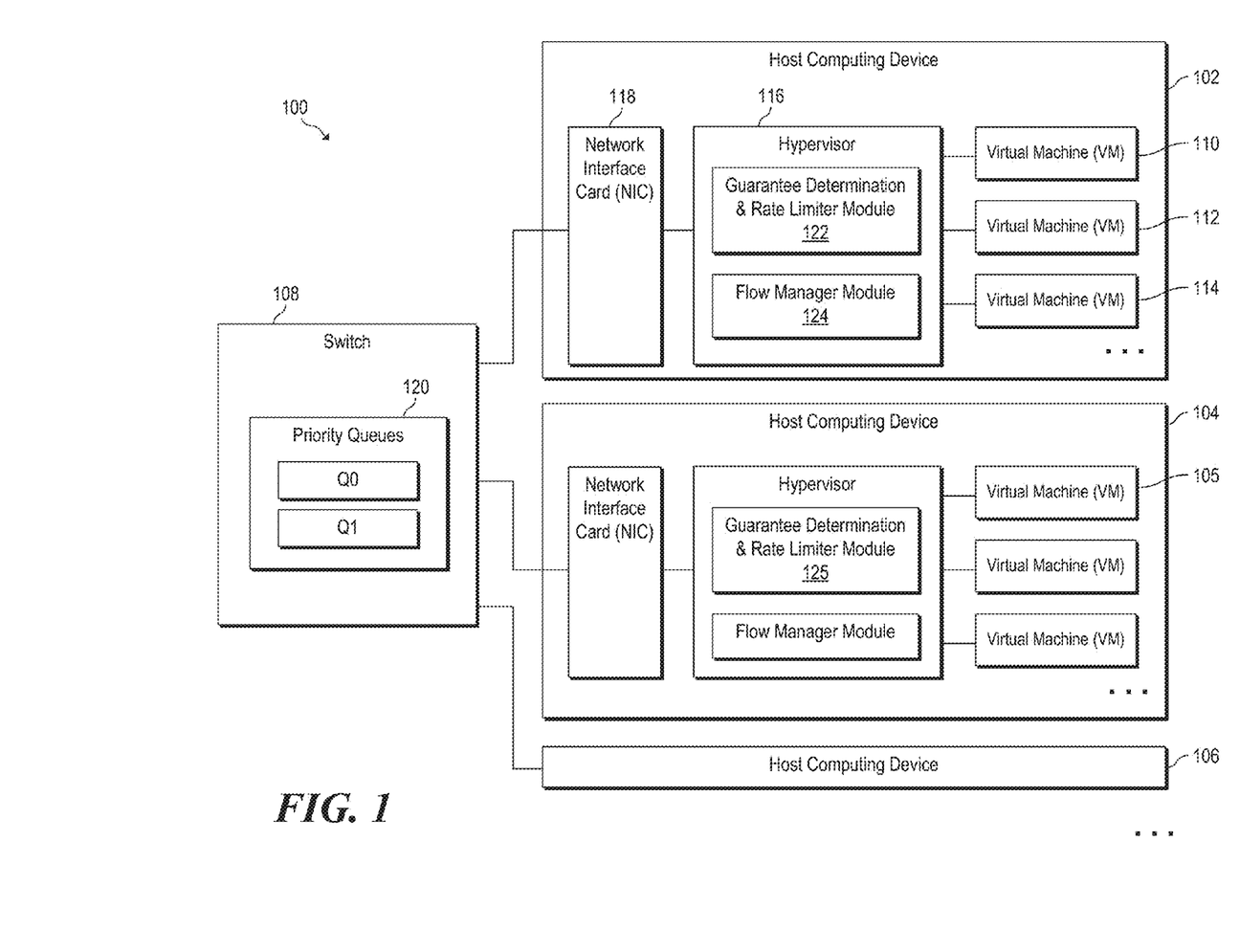
FIG. 1 is a block diagram of an example network setup that implements work conserving bandwidth guarantees using priority.

FIG. 1 is a block diagram of an example network setup 100 that implements work conserving bandwidth guarantees using priority. Network setup 100 may include a number of host computing devices (e.g., 102, 104, 106) and at least one hardware switch (e.g., switch 108). Host computing devices 102, 104, 106 may communicate with hardware switch 108, for example, via Ethernet wires or some other wired or wireless network link. Host computing devices 102, 104, 106 may communicate with each other by communicating packets of information to and receiving packets of information from switch 108. Host computing devices 102, 104, 106 may each include a network interface card (NIC) (e.g., 118) that allows the host computing device to communicate via a network (e.g., with switch 108).

Host computing devices (e.g., 102, 104, 106) may each be any computing system or computing device that is capable of communicating with other computing devices via a network, and is capable of running virtual machines. It should be understood that while some host computing devices (e.g., 106) may not show all their internal components, they may include components similar to other host computing devices shown (e.g., 102, 104). Host computing devices (e.g., 102) may each include a number of virtual machines (VMs) (e.g., 110, 112, 114). As described above, tenants may reserve one or more VMs, for example, to execute applications. A particular tenant's VMs may be consolidated on a single host computing device or distributed across multiple host computing devices. Host computing devices (e.g., 102) may each include a hypervisor (e.g., 116). The term hypervisor may refer to a piece of computer software, firmware or hardware that instantiates, runs and/or manages virtual machines. A hypervisor (e.g., 116) may present operating systems of VMs (e.g., 110, 112, 114) with a virtual operating platform (e.g., virtualized hardware resources). The hypervisor may also manage the execution of the VM operating systems. The term hypervisor may also generally encompass special VMs that are under the control of the host operating system and are used to run computer software that is too complex to run in the host operating system itself. In the example of FIG. 1, hypervisors (e.g., 116) may each include a guarantee determination and rate limiter module 122 and a flow manager module 124. These modules (e.g., 122, 124) may include a series of instructions encoded on a machine-readable storage medium and executable by a processor of the host computing device (e.g., 102). In addition or as an alternative, these modules may include one or more hardware devices including electronic circuitry for implementing the functionality described herein.

In various descriptions herein, reference may be made to at least one source VM (e.g., a first VM) and at least one destination VM (e.g., a second VM), for example, where the source VM and destination VM form a particular VM-to-VM pair. As one example, and referring to FIG. 1, VM 110 may be a source VM, and VM 105 may be a destination VM. The source and destination VMs of a VM-to-VM pair may both be reserved to the same tenant, or may be reserved by different tenants. The VM pair including VM 110 to VM 105 may be associated with a particular minimum bandwidth guarantee. Such a bandwidth guarantee may be determined (at least in part) by guarantee determination and rate limiter module 122, for example, based on a minimum sending guarantee bandwidth out of VM 110 and a minimum receiving guaranteed bandwidth into VM 105. Such minimum sending and receiving guarantee bandwidths may be further based on general guarantee bandwidths associated with each VM. More details may be provided below about how various bandwidth guarantees are determined.

Switch 108 may be any hardware switch that is capable of connecting multiple computing devices such that the computing devices can communicate in a network. Switch 108 may be a commodity (e.g., off-the-shelf) switch or a custom switch. Switch 108 may include circuitry, firmware, software or the like to implement a number of priority queues 120 (e.g., Q0 and Q1 as depicted in FIG. 1). Switch 108 may be configured to establish the priority queues (e.g., a certain number of priority queues and their priority and priority behavior) and may be configured to route each packet entering the switch into one of the priority queues based on various pieces of information (e.g., a tag or header of the packet, a particular path of a multi-path TCP connection or other multi-path transport connection on which the packet traveled, etc.). The priority queues and their priority behavior may act to regulate internal movement of traffic (e.g., packets) after the traffic enters the switch and before it exits the switch, which may in turn affect the arrival of traffic to downstream devices (e.g., host computing device 104 and VM 105). In some examples, switch 108 may include a number of rate limiters, which may regulate the rate at which traffic may enter and/or exit the various priority queues 120. Rate limiters may also be configured. In some examples, rate limiters may not be required in switch 108, for example, if modules (e.g., 122) in the host computing devices perform sufficient rate limiting.

In the example of FIG. 1, the priority queues in switch 108 (e.g., priority queues 120) include a Q0 queue and a Q1 queue. Q0 may be a higher priority queue for traffic that is below (e.g., has not exceeded) particular bandwidth guarantees (e.g., a bandwidth guarantees for the VM-to-VM pair from VM 110 to VM 105). Q1 may be a lower priority queue for opportunistic (i.e., work conservation) traffic. In other examples, switch 108 may include more than one high priority queue and/or more than one lower priority queue. More details regarding these two types of queues and how traffic may be routed to these queues may be described in more detail below.

In order for a host computing device (e.g., 102) to be able to send packets to switch 108 that may be appropriately routed to priority queues in the switch, the NIC 118 in the host computing device may be configured (e.g., settings that support tagged packets, multi-path TCP, etc.). Additionally, NIC 118 may also implement priority queues and/or priority queue settings similar to the priority queues in switch 108, for example, to ensure that guaranteed traffic goes through an entire path from VM to VM without being affected by the lower priority opportunistic traffic. Various descriptions herein may primarily describe priority queuing in the hardware switch, but it should be understood that various descriptions may be expanded to include similar priority queuing in the NICs, e.g., in addition to or in replacement of priority queuing in the hardware switch.

It should be understood that FIG. 1 shows just one example network setup, where host computing devices are networked via a single switch 108. In other examples, a network setup may include multiple switches, and a network path from one VM in one host computing device to a VM in another host computing device may pass through multiple switches, e.g., cascading switches, a hierarchy of switches, etc. In such a network setup, one or more of the switches in the path may implement priority queuing similar to that described herein. It should also be understood that through various techniques, tenants may receive VM-to-VM bandwidth guarantees for both VM-to-VM pairs within the same host computing device and VM-to-VM paths between different host computing devices. The present disclosure focuses mainly on VM-to-VM pairs between different host computing devices, e.g., pairs that pass through at least one hardware switch (e.g., 108). Still, the techniques and solutions described herein may be used for VM-to-VM pairs within a single host computing device, for example, implemented within a virtual network interface, virtual switch, etc.

Guarantee determination & rate limiter module 122 may determine VM-to-VM pair bandwidth guarantees (e.g., sending and receiving) between various VMs (e.g., 110, 112, 114, VMs of host computing device 104, VMs of host computing device 106, etc.) in a network setup (e.g., 100). It may be assumed that each VM is assigned (e.g., by a host administrator, host manager, etc.) a minimum sending guaranteed bandwidth and a minimum receiving guaranteed bandwidth. Such guarantees may be computed based on maximum server occupancy, worst case network utilization and similar metrics. Module 122 may determine a sending VM-to-VM guarantee from a first VM (e.g., 110) to a second VM (e.g., 105) by dividing or partitioning a minimum sending guarantee bandwidth for the first VM into preliminary VM-to-VM sending guarantees for each of the VMs that the first VM communicates with, including the second VM. The same dividing or partitioning may be done for the second VM with regard to a minimum receiving guarantee bandwidth of the second VM. Then, the minimum sending guarantee bandwidth between the first VM (e.g., 110) and the second VM (e.g., 105) may be the lesser of (i.e., min of) the preliminary sending guarantee of the first VM from the first VM to the second VM and the preliminary receiving guarantee of the second VM from the first VM to the second VM. In some examples, a guarantee determination and rate limiter module (e.g., 125) in one host computing device (e.g., 104) may communicate with a similar module (e.g., 122) in another host computing device (e.g., 102) to share minimum bandwidth guarantee information. Similar minimum bandwidth guarantee determinations may be made for pairs (both sending and receiving) between any number of the VMs of the network setup.

The model described above where VMs are assigned minimum sending and receiving bandwidth guarantees and where such guarantees are divided or partitioned into VM-to-VM guarantees may be referred to as a hose model for bandwidth guarantees. The hose model is one example of how guarantee determination & rate limiter module 122 may determine VM-to-VM bandwidth guarantees. In other examples, module 122 may use other bandwidth guarantee models, for example a pipe model. A pipe model may already assume pair guarantees from source VMs to the various destination VMs and to destination VMs from various source VMs. Then, module 122 may determine, for example, the minimum sending guarantee bandwidth between a first VM (e.g., 110) and a second VM (e.g., 105) by determining the lesser of (i.e., min of) the assumed sending guarantee of the first VM from the first VM to the second VM and the assumed receiving guarantee of the second VM from the first VM to the second VM. In other examples, module 122 may use any other type of solution that provides bandwidth guarantees, for example, solutions that are not work conserving. In yet other examples, module 122 may replace the module or part responsible for work conservation (e.g., inefficient work conservation) in solutions that are work conserving.

A system administrator or the like may ensure that the host computing devices, switches and other network/data center components are capable of providing the advertised minimum bandwidth guarantees to all tenants, applications, etc. For example, an admission control framework must ensure that the sum of the bandwidth guarantees (e.g., for various VM-to-VM pairs) that traverse any one path is smaller than the capacity of that path.

Once guarantee determination & rate limiter module 122 has determined VM-to-VM pair bandwidth guarantees, module 122 may enforce such guarantees, for example, using rate limiters. In general, module 122 may ensure that the rate of packets directed (e.g., routed and/or tagged) for high priority (explained in more detail below) for a particular VM-to-VM pair or path does not exceed the bandwidth guarantee(s) for the pair or path (e.g., traffic is limited between pairs of VMs and for a particular path). By rate-limiting the traffic between each pair of VMs, minimum bandwidth guarantees (e.g., determined as described above) of each VM-to-VM pair (e.g., in the pipe model) or for each VM in general (e.g., in the hose model) may be satisfied. In some examples, such rate limiters are included in the hypervisor (e.g., 116), for example, in module 122. A particular rate limiter (e.g., in module 122) may enforce, for a particular VM-to-VM pair (e.g., between VM 110 and VM 105), a bandwidth guarantee for communication from VM 110 to VM 105, and may also enforce a bandwidth guarantee for communication from VM 105 to VM 110. In some situations, VMs may perform rate limiting, as described below.

By implementing rate limiting in the host computing devices (e.g., in module 122), rate limiters may not be needed in switch 108. The rate limiters in the host computing devices may ensure that the traffic into priority queues 120 abides by bandwidth guarantees. For example, traffic into a high priority queue (e.g., Q0) may be limited to a sum of the bandwidth guarantees (e.g., for VM-to-VM pairs) for the particular VM-to-VM paths that route through a switch that contains the high priority queue. Then, the behavior of the priority queuing in the switch may allow opportunistic traffic that is directed into lower priority queues (e.g., Q1) to travel or move when all high priority traffic has been routed and sent.

Figure 2:
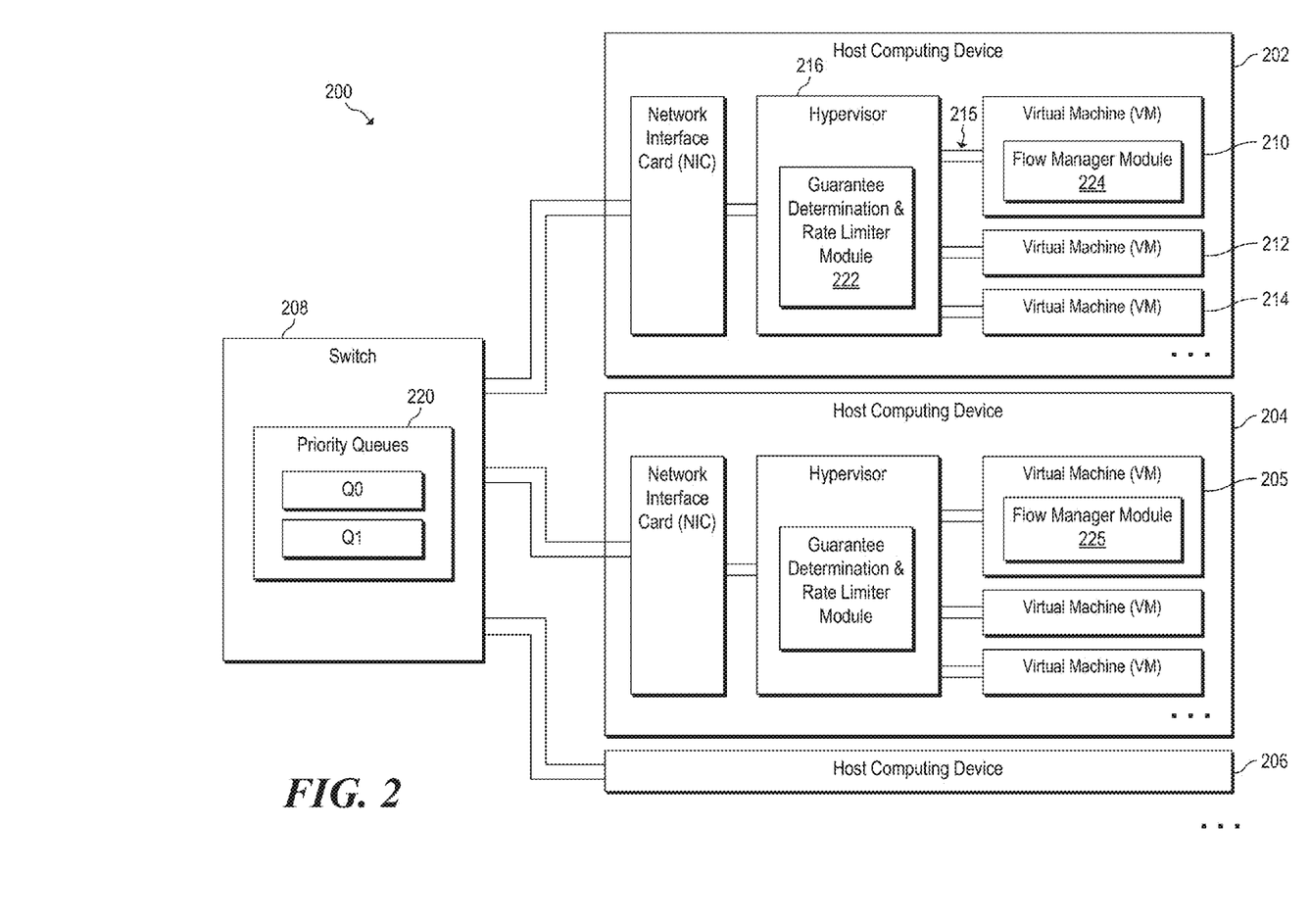
FIG. 2 is a block diagram of an example network setup that implements work conserving bandwidth guarantees using priority.

FIG. 2 is a block diagram of an example network setup 200 that implements work conserving bandwidth guarantees using priority. FIG. 2 and network setup 200 are similar to FIG. 1 and network setup 100 in many respects. For example, network setup 200 may include a number of host computing devices (e.g., 202, 204, 206) and at least one hardware switch (e.g., switch 208). Switch 208 may include a number of priority queues 220. Host computing devices (e.g., 202) may each include a number of virtual machines (VMs) (e.g., 210, 212, 214). Host computing devices (e.g., 202) may each include a hypervisor (e.g., 216). The hypervisors (e.g., 216) may each include a guarantee determination and rate limiter module 222. FIG. 2 may be different than FIG. 1 in various respects. For example, the hypervisors (e.g., 216) may not include a flow manager module (e.g., similar to 124). Instead, a similar flow manager module (e.g., 224, 225) may be located in each of the virtual machines (e.g., 210, 212, 214, 205, etc.). Various descriptions herein may refer to a flow manager module generally, and it should be understood that such descriptions may apply, except as otherwise indicated, to a flow manager module implemented in a hypervisor (e.g., as shown in FIG. 1) or a flow manager module implemented in a VM (e.g., as shown in FIG. 2). Likewise, various other descriptions of components of FIG. 1 may apply to similar components of FIG. 2, unless otherwise indicated.

The flow manager module (e.g., 224) may use a multi-path TCP protocol or another type of multi-path transport protocol. For example, in FIG. 2, a multi-path protocol running in the VMs (e.g., 210) may use a number of virtual paths, where each virtual path may be associated with a particular priority (e.g., high priority and lower priority). In this example, the flow manager module (e.g., 224) may monitor traffic for various VM-to-VM pairs, e.g., a flow out of a first VM (e.g., 210) that is being sent to a second VM (e.g., 205). For a particular VM-to-VM pair, flow manager module 224 may route packets into different virtual paths based on whether the flow for the pair has exceeded a bandwidth guarantee for the pair. The reference number 215 may, in the example of FIG. 2, represent a network connection that implements a multi-path TCP protocol with two virtual paths. Alternatively, reference number 215 may represent multiple physical paths and/or multiple virtual network interfaces exposed to the VM by the hypervisors, as described in more detail below. It should be understood that the example of FIG. 1 (e.g., flow manager module 124) may also use a multi-path protocol to distribute the packets across multiple virtual paths (e.g., some with guarantees and some without guarantees). In that example, the VMs may only see a single virtual network interface.

In some situations, two VMs may communicate using multiple physical paths, in which case both traffic with guarantees (e.g., high priority traffic) and work conserving traffic (e.g., low priority traffic) may be routed across the multiple physical paths. In this situation, packets may be scattered across all the physical paths (e.g., by a packet distributor), and the multiple physical paths may be treated as a single larger virtual path. Then, a multi-path transport protocol may see or expose a certain number of (e.g., two) virtual paths. A packet distributor module may spread the packets on these virtual paths (and across the physical paths). Alternatively, each of the multiple physical paths may be treated (e.g., by the multi-path protocol) as a separate virtual path. In this case, the multi-path protocol may see or expose 2*N virtual paths, where N is the number of physical paths. N of these paths may be associated with guaranteed traffic and N with work conserving traffic. Any combination of the above two examples (e.g., a certain number of virtual paths, and one virtual path for each physical path) may be implemented. For example, N+1 virtual paths may be exposed by a multi-path transport protocol, e.g., one virtual path for the traffic with guarantees and N virtual paths for the work conserving traffic. In this case, a packet distributor may spread the packets in the virtual path with guarantees across the multiple physical paths.

Referring again to FIG. 2, in some examples, multiple virtual network interfaces or addresses may be provided to the VMs to indicate which traffic will be rate limited (e.g., traffic below guarantees) and which traffic will be opportunistic or work conserving. For example, a provider or administrator of network setup 200 may expose one virtual network interface or address to a VM for traffic with bandwidth guarantees and one network interface or address for the traffic without guarantees. Traffic that travels between two guarantee interfaces/addresses of two VMs may be rate-limited to a guarantee bandwidth (e.g., by module 222). Then, such traffic may be routed into a high priority queue, e.g., Q0 in switch 208. Traffic that travels between two non-guaranteed interfaces/addresses of two VMs (or between one guaranteed interface/address and one non-guaranteed interface/address) may be routed into at least one lower priority queue, e.g., Q1 in switch 208.

Guarantee determination and rate limiter module 222 may be similar to module 122 of FIG. 1. Module 222 may ensure that the total traffic routed for high priority traveling out of each VM (e.g., multiple flows) does not exceed the total value of the bandwidth guarantees associated with VM-to-VM pairs out of that particular VM. In the example of FIG.

2, each VM may route packets into different virtual paths according to priority, and module 222 may rate limit the traffic on a high priority virtual path (e.g., a virtual path for traffic below rate guarantees). In some situations, guarantee determination and rate limiter module 222 may determine VM-to-VM pair bandwidth guarantees and then may signal a sending rate for each virtual path to the VMs. The VMs may then perform the rate limiting on the high priority virtual paths. Alternatively, module 222 performs the rate limiting on the high priority virtual paths. In this situation, the VMs may effectively still rate limit their high priority virtual paths because the VMs may notice dropped packets (e.g., dropped at module 222 due to rate limiting). In this case, the VMs may send fewer packets routed for high priority (e.g., traffic below rate guarantees).

As yet another example network setup (not shown in a particular figure), the guarantee determination and rate limiter module (e.g., 222) and the flow manager module (e.g., 124, 224 etc.) may be partly or entirely implemented inside a NIC (e.g., 118) or inside a switch (e.g., 208). Thus, various descriptions of the guarantee determination and rate limiter module and the flow manager module provided herein may apply to this example. Additionally, priorities may be applied at NICs or switches based on the source and destination addresses, such as IP addresses or Ethernet addresses.

Figure 3:
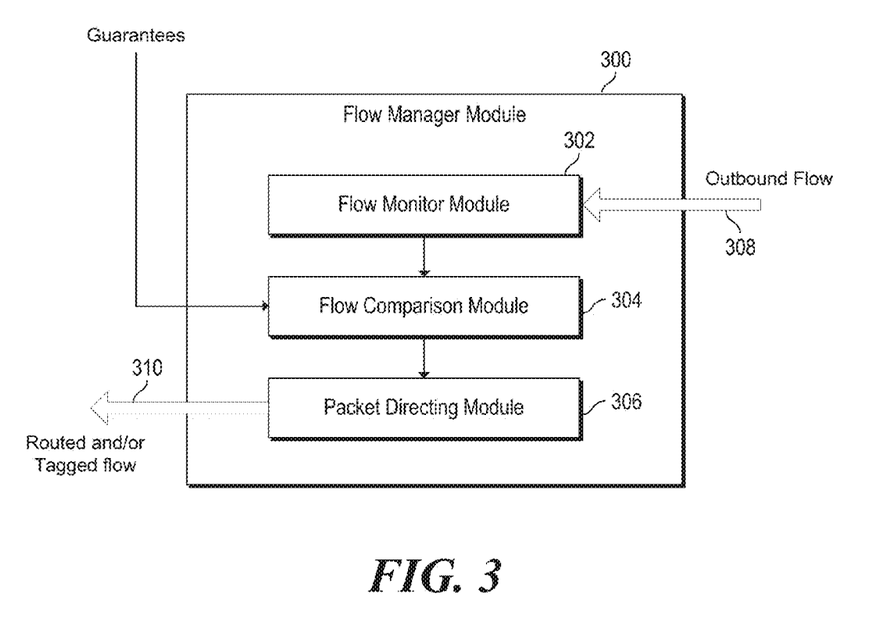
FIG. 3 is a block diagram of an example flow manager module used to implement work conserving bandwidth guarantees using priority.
Figure 4:
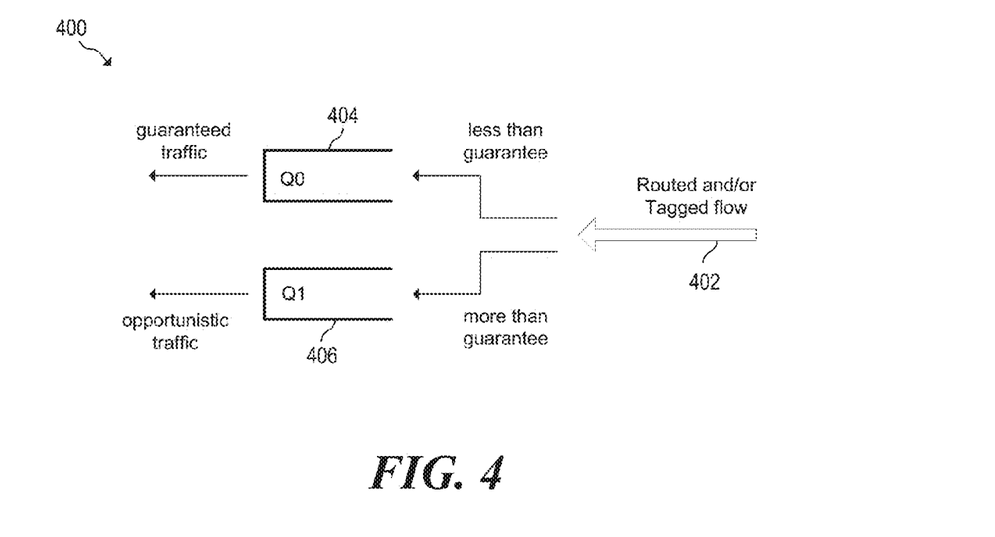
FIG. 4 is a flow diagram of an example scheme by which a flow manager module may direct packets of information according to priority.

FIG. 3 is a block diagram of an example flow manager module 300. Flow manager module 300 may be similar to flow manager module 124, 224 and/or 225. Flow manager module 300 may receive packets of information for various paths monitored by the flow manager module 300. Such packets of information may be indicated in FIG. 3 as outbound flow 308. Outbound flow 308 may represent the flow of packets out of at least one VM, and being sent to other VMs. Flow manager module 300 may output packets of information (e.g., the same packets of information received). Such packets of information may be indicated in FIG. 3 as routed and/or tagged flow 310. Each packet of information output by module 300 may be directed (e.g., routed and/or tagged) in a particular manner (e.g., according to priorities). Flow manager module 300 may include a number of modules 302, 304, 306. Each of these modules may be implemented as a series of instructions encoded on a machine-readable storage medium and executable by a processor of a host computing device (e.g., 102). In addition or as an alternative, these modules may include one or more hardware devices including electronic circuitry for implementing the functionality described herein. FIG. 4 is a flow diagram 400 of an example scheme by which flow manager module 300 may direct (e.g., route and/or tag) packets of information according to priority.

Flow monitor module 302 may monitor traffic (e.g., outbound flow 308) on various VM-to-VM paths, e.g., a flow out of a first VM (e.g., 110 or 210) that is being sent to a second VM (e.g., 105 or 205). Flow comparison module 304 may, for a particular VM-to-VM pair, determine whether the flow of packets through the pair exceeds a particular bandwidth guarantee for the path. Flow comparison module 304, as shown in FIG. 3, may receive minimum bandwidth guarantees (e.g., from module 122 or 222) for the various paths monitored by flow manger module 300. Packet directing module 306 may, as long as the traffic flow is below the bandwidth guarantee for a particular pair, direct (e.g., tag and/or route) the traffic according to a first priority (e.g., high priority). Then, when the traffic flow on the path exceeds the bandwidth guarantee (e.g., opportunistic traffic), module 306 may direct the traffic according to a second priority (e.g., lower priority). All directed (e.g., routed and/or tagged) traffic output by module 300 may be indicated by flow 310 of FIG. 3.

Referring to FIG. 4, flow diagram 400 shows how a directed (e.g., routed and/or tagged) flow 402 (e.g., similar to 310) may cause various packets of information to be routed into different priority queues (e.g., 404, 406). Such routing into different priority queues may occur in a network switch (e.g., 108 or 208) and/or in NICs (e.g., 118) of various host computing devices (e.g., 102). As can be seen in FIG. 4, packets of information that are directed as being below the bandwidth guarantee may be caused to be placed into a first queue Q0 (e.g., a high priority queue), and packets of information that are directed as being above the bandwidth guarantee (e.g., opportunistic traffic) may be caused to be placed into a second queue Q2 (e.g., a lower priority queue). By performing such priority tagging and/or routing, opportunistic traffic (e.g., once it reaches switch 108 or 208) may be allowed to travel or move if there is spare bandwidth in the network, which may allow the overall traffic on the particular VM-to-VM pair to exceed the bandwidth guarantee for the pair.

Flow manager module 300 may direct (e.g., tag and/or route) packets of information differently (e.g., with different priorities) within the same flow, e.g., for the same tenant, application, service, types of packets and the like. This may provide additional benefits over various other solutions that use priority queues to simply implement different service levels for different tenants, applications, services, types of packets, etc. Thus, flow manager module 300 may allow a VM-to-VM pair to opportunistically utilize spare bandwidth from a set of VMs that are not fully utilizing their bandwidth guarantees to send traffic that exceeds a bandwidth guarantee of the VM-to-VM pair.

Flow manager module 300 (e.g., via module 306) may direct packets of information in various ways. The terms direct, directed, directing and the like may generally refer to causing packets to arrive at different destinations based on the directing. Tagging and routing may be two specific examples of directing. As a first example of how module 300 may direct packets, and as shown by FIG. 1, a flow manager module 124 may be located in the hypervisors (e.g., 116) of the host computing devices (e.g., 102). Flow manager module 124 may monitor traffic on various VM-to-VM paths, e.g., a flow out of a first VM (e.g., 110) that is being sent to a second VM (e.g., 105). For a particular pair, flow manager module 124 may tag packets with priority tags (e.g., high priority, low priority, etc.). The terms tag, tagged, tagging and the like may refer to marking packets (e.g., data bits in the packets) with encoded information. Packets may be tagged with priorities in various ways. For example, priorities may be encoded into packet headers, e.g., appropriate DiffServ bits in the IP header. As another example, flow manager module 124 in hypervisor 116 may handle a multi-path TCP connection (or other multi-path transport connection), and may route packets into various virtual paths of the connection based on priority. Such a multi-path connection may be implemented in a similar manner to the multi-path TCP connection described herein with regard to the flow manager modules in the VMs.

In the example of FIG. 2, flow manager modules (e.g., 224, 225) may be located in the VMs (e.g., 210, 212, 214, 205, etc.) of the host computing devices. As mentioned above, a part of the flow manager module functionality may be partly implemented by a multi-path TCP connection or other type of multi-path transport protocol. Each multi-path connection may have a number of virtual paths, where each virtual path may be associated with a particular priority (e.g., high priority and lower priority). Each virtual path may then be associated with a particular priority queue (e.g., Q0 for high priority and Q1 for lower priority) in hardware switch 208. For a particular VM-to-VM pair, flow manager module 224 may route packets into various virtual paths based on whether the flow in the path has exceeded a bandwidth guarantee for the pair. In some examples, the high priority virtual path is associated with traffic that is below a bandwidth guarantee, and thus, the high priority virtual path may be rate limited (e.g., by module 222), as described above.

Regardless of how traffic is directed (e.g., routed and/or tagged) for the various VM-to-VM pairs, packets of the traffic may arrive at a switch (e.g., 108 or 208) with a particular tag or via a particular virtual path. Based on these designations, the switch may place packets in appropriate priority queues of the switch. Then, the packets may be processed according to the priority scheme of the switch.

Figure 5:
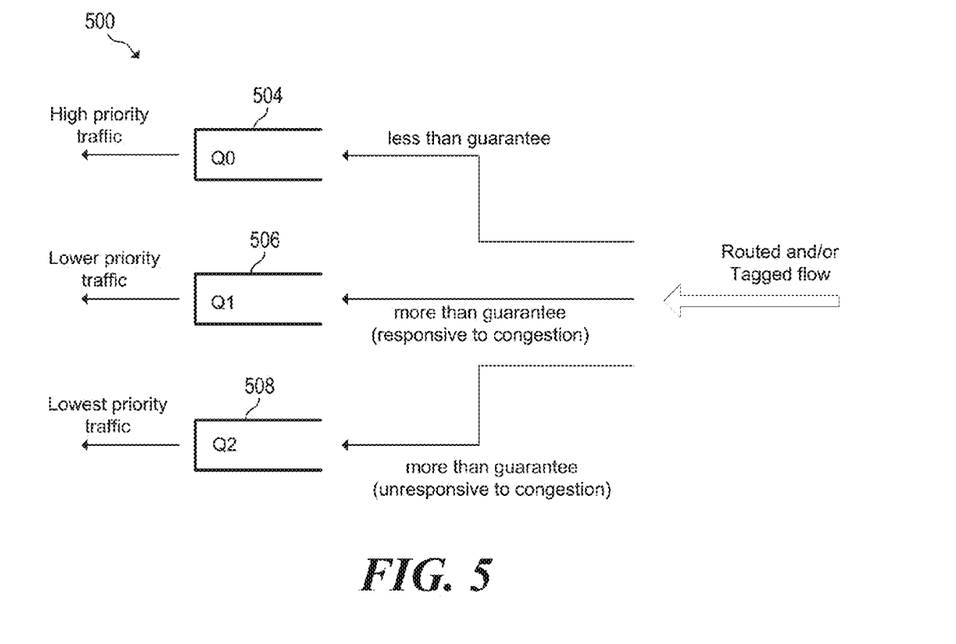
FIG. 5 is a flow diagram of an example scheme by which a flow manager module may direct packets of information according to priority.

In some examples, the solutions described herein may be expanded to implement various fairness schemes to fairly allocate spare bandwidth to various VM-to-VM pairs. Implementing fairness may, for example, prevent a particular tenant, VM or VM-to-VM pair from consuming the entire spare bandwidth in the network. As a first fairness example, FIG. 5 shows a flow diagram 500 of an example scheme by which flow manager module 300 may direct (e.g., route and/or tag) packets of information according to priority. In this example, more than two priority queues may be used (e.g., priority queues Q0 504, Q1 506 and Q2 508). In this example, and referring to FIGS. 1 and 2, switch 108 and/or 208 may include three priority queues (e.g., Q0, Q1 and Q2). Returning to FIG. 5, it can be seen that the fairness scheme includes two queues (e.g., Q1 and Q2) for opportunistic traffic (e.g., traffic that has exceeded a bandwidth guarantee). More specifically, a first queue (e.g., Q1) for opportunistic traffic may be used for traffic that is responsive to network congestion, and a second queue (e.g., Q2) may be used for traffic that is unresponsive to network congestion. Both of queues Q1 and Q2 may have a lower priority than Q0, the queue for traffic that abides by bandwidth guarantees.

Traffic may be responsive to network congestion, for example, if the traffic travels according to a data transport protocol (e.g., TCP) that is designed to adapt to network congestion. The TCP protocol may limit more traffic from being sent when the network is congested (e.g., as indicated by packet loss, Explicit Congestion Notification or ECN, etc.). Traffic may be unresponsive to network congestion, for example, if the traffic travels according to a data transport protocol (e.g., UDP) that does not consider network congestion or if the traffic travels via a malicious flow (e.g., a malicious TCP flow). The UDP protocol may continue to send as many packets as possible even when the network is congested. Thus, in one specific example, Q0 may hold traffic that abides by bandwidth guarantees, Q1 may hold TCP traffic that exceeds bandwidth guarantees and Q2 may hold UDP traffic that exceeds bandwidth guarantees. Such a fairness scheme may incentivize tenants to use transport protocols that are responsive to congestion (e.g., TCP).

As a second fairness example, a spare bandwidth allocation module (e.g., implemented in the hypervisor or in the VMs) may determine how to fairly allocate spare bandwidth (from a first VM-to-VM path) to various other VM-to-VM pairs. The spare bandwidth allocation module may use rate limiters to dynamically increase the rate of flow on the various other VM-to-VM pairs beyond the guarantees allocated to those pairs (e.g., by module 122). The spare bandwidth allocation module may only increase such rates when it is determined that there is little or no congestion in the network. The spare bandwidth allocation module may determine whether there is any spare bandwidth on the VM-to-VM pairs it monitors, and then fairly divide the spare bandwidth between the various VM-to-VM pairs.

The spare bandwidth allocation module may divide the spare bandwidth between the various VM-to-VM pairs based on (e.g., in proportion to) the bandwidth guarantees of the various VM-to-VM pairs. For example, assume that a first VM-to-VM pair (e.g., from VM X to VM Y) has a minimum bandwidth of 200 Mbps, a second VM-to-VM pair (e.g., from VM Z to VM T) has a minimum bandwidth of 100 Mbps, and both pairs share the same network path. The spare bandwidth allocation module may allocate spare bandwidth to the first pair and the second pair according to a 2:1 ratio. The spare bandwidth allocation module may, therefore, use a weighted scheme for allocating spare bandwidth, which may implement a level of fairness and may prevent a particular pair from consuming all spare bandwidth.

In some examples, the solutions described herein may be expanded to provide lower latency guarantees, e.g., to "premium" tenants, applications, etc. Premium tenants, applications, etc. may still have their traffic limited to particular bandwidth guarantees, but they may experience lower latencies than regular tenants. In other words, host computing devices may still ensure (e.g., via module 122, 222, etc.) that the total traffic that abides by guarantees, for premium and regular tenants, applications, etc. does not exceed the bandwidth guarantees on each path. The traffic of regular tenants, applications, etc. may still travel at minimum bandwidth guarantees, but may still experience some delays/latencies.

Figure 6:
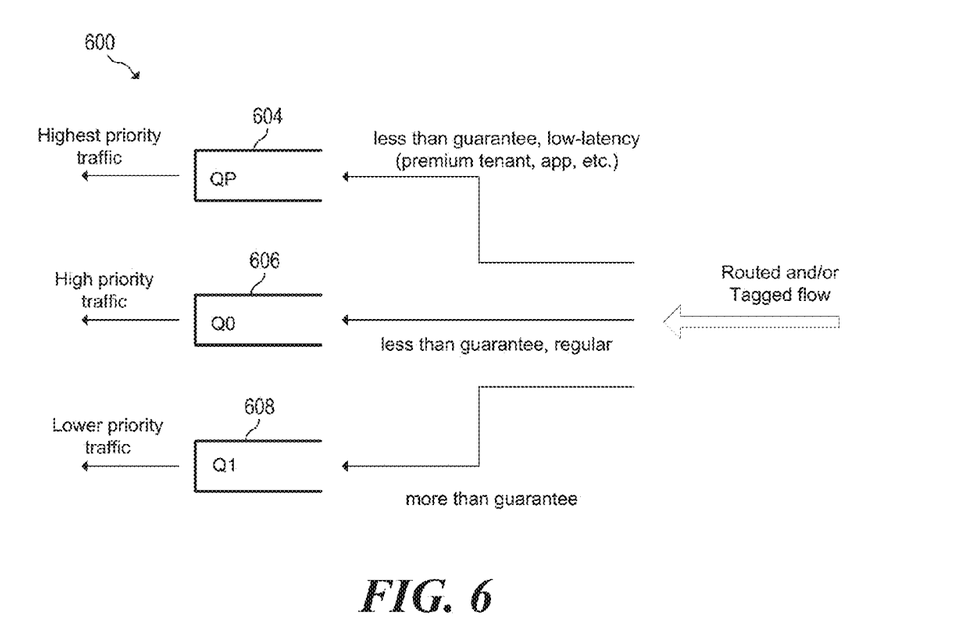
FIG. 6 is a flow diagram of an example scheme by which a flow manager module may direct packets of information according to priority.

FIG. 6 shows a flow diagram 600 of an example scheme by which flow manager module 300 may direct (e.g., route and/or tag) packets of information according to priority. In this example, more than two priority queues may be used (e.g., priority queues QP 604, Q0 606 and Q1 608). In this example, and referring to FIGS. 1 and 2, switch 108 and/or 208 may include three or more priority queues (e.g., QP, Q0 and Q1). Returning to FIG. 6, it can be seen that this solution includes two queues (e.g., QP and Q0) for traffic that abides by bandwidth guarantees. More specifically, a first queue (e.g., QP) may be used for traffic that abides by bandwidth guarantees for a premium level of tenant, application, etc. (e.g. a tenant/application promised low-latency handling of traffic). A second queue (e.g., Q0) may be used for traffic that abides by bandwidth guarantees for a regular level of tenant, application, etc. Alternatively, for a particular VM-to-VM pair, part of the guaranteed traffic may be low latency and part of the guaranteed traffic may be regular; in this way, traffic for a VM-to-VM pair may span across all queues (e.g., QP, Q0, Q1). A switch, for example, may process the packets stored in QP before it processes packets stored in Q0, and both of queues QP and Q0 may have a higher priority than Q1 and perhaps other queues for opportunistic traffic.

In these examples, flow manager module 300 may direct (e.g., route and/or tag) packets of information based on whether the flow exceeds minimum bandwidth guarantees and based on the level of the tenant, application, etc. (e.g., regular or premium). As can be seen in FIG. 6, packets of information that are directed (e.g., tagged and/or routed) as being below the bandwidth guarantee and associated with a premium tenant, application, etc. or generally being determined as low latency traffic may be caused to be placed into a first queue QP (e.g., the highest priority queue), and packets of information that are directed (e.g., tagged and/or routed) as being below the bandwidth guarantee and associated with a regular tenant, application, etc. or generally being determined as not low latency may be caused to be placed into a second queue Q0 (e.g., a higher priority queue). Packets of information that are directed (e.g., tagged and/or routed) as being above the bandwidth guarantee (e.g., opportunistic traffic) may be caused to be placed into another queue Q1 (e.g., a lower priority queue). By performing such priority directing (e.g., tagging and/or routing), opportunistic traffic (e.g., once it reaches switch 108 or 208) may be allowed to travel or move if there is spare bandwidth in the network, and premium tenants, applications, etc. may experience premier performance.

Figure 7:
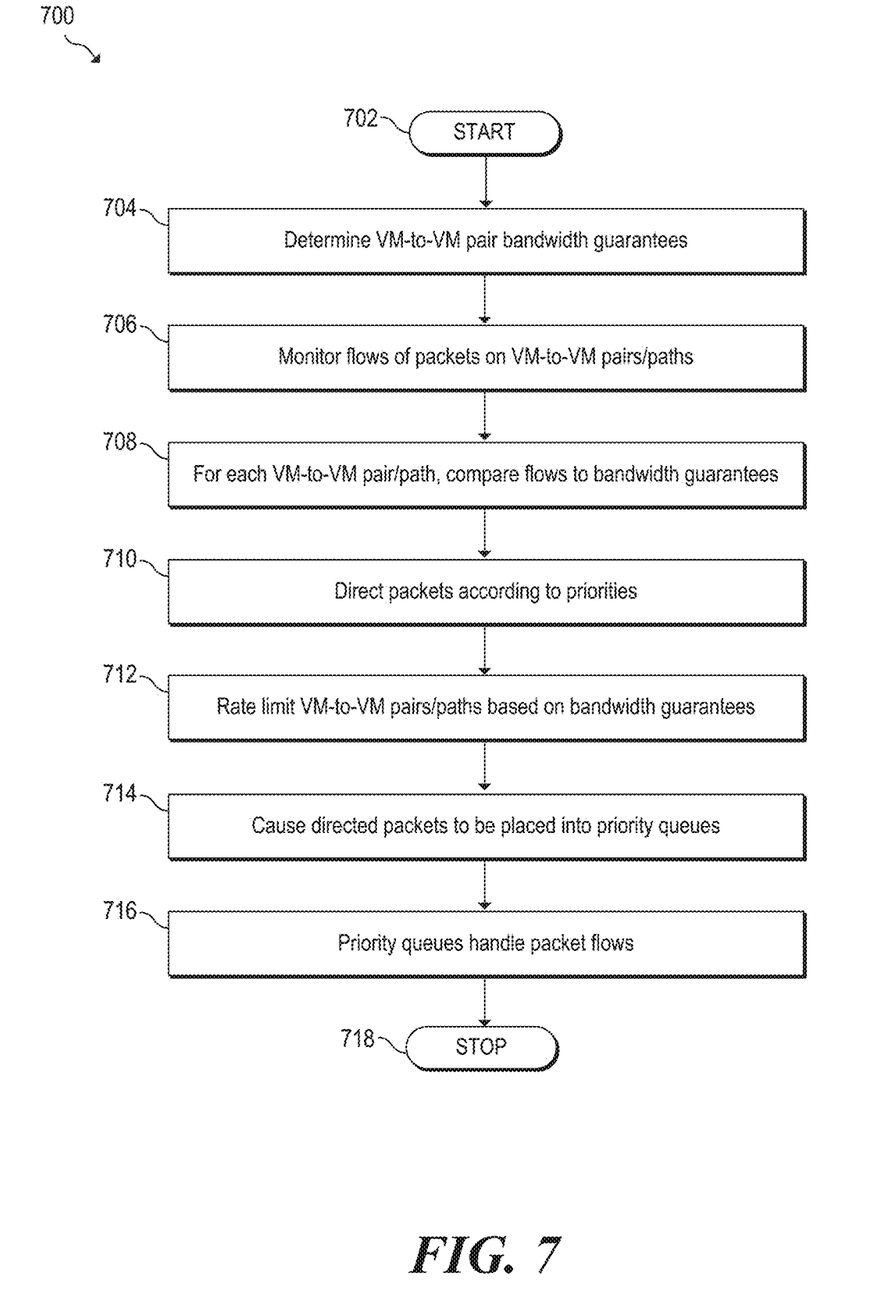
FIG. 7 is a flowchart of an example method for work conserving bandwidth guarantees using priority.

FIG. 7 is a flowchart of an example method 700 for work conserving bandwidth guarantees using priority. The execution of method 700 is described below with reference to a general host computing device, which may be similar to host computing devices 102, 104, 106, 202, 204 and/or 206 of FIGS. 1 and/or 2. Various other suitable computing devices may execute method 700, for example, host computing device 800 of FIG. 8. Method 700 may be implemented in the form of executable instructions stored on a machine-readable storage medium, such as storage medium 820, and/or in the form of electronic circuitry. In alternate embodiments of the present disclosure, one or more steps of method 700 may be executed substantially concurrently or in a different order than shown in FIG. 7. In alternate embodiments of the present disclosure, method 700 may include more or less steps than are shown in FIG. 7. In some embodiments, one or more of the steps of method 700 may, at certain times, be ongoing and/or may repeat.

Method 700 may start at step 702 and continue to step 704, where a host computing device may determine (e.g., via module 122 or 222) VM-to-VM pair bandwidth guarantees. At step 706, the host computing device may monitor (e.g., via module 124 or 224) flows of packets on the VM-to-VM pairs. At step 708, the host computing device may, for each VM-to-VM pair, compare (e.g., via module 124 or 224) the flows to the bandwidth guarantees. At step 710, the host computing device may, based on the comparison, direct (e.g., route and/or tag) packets (e.g., via module 124 or 224) according to priorities. At step 712, the host computing device may rate limit (e.g., via module 122 or 222) the VM-to-VM pairs based on the bandwidth guarantees. For example, traffic below bandwidth guarantee(s) may be rate limited. At step 714, the directing (e.g., routing and/or tagging) of the packets may cause various packets to be placed into priority queues (e.g., in a hardware switch). At step 716, such priority queues and/or the hardware switch may handle the flow of the packets, e.g., implementing a particular priority scheme in the hardware switch. Method 700 may eventually continue to step 718, where method 700 may stop.

Figure 8:
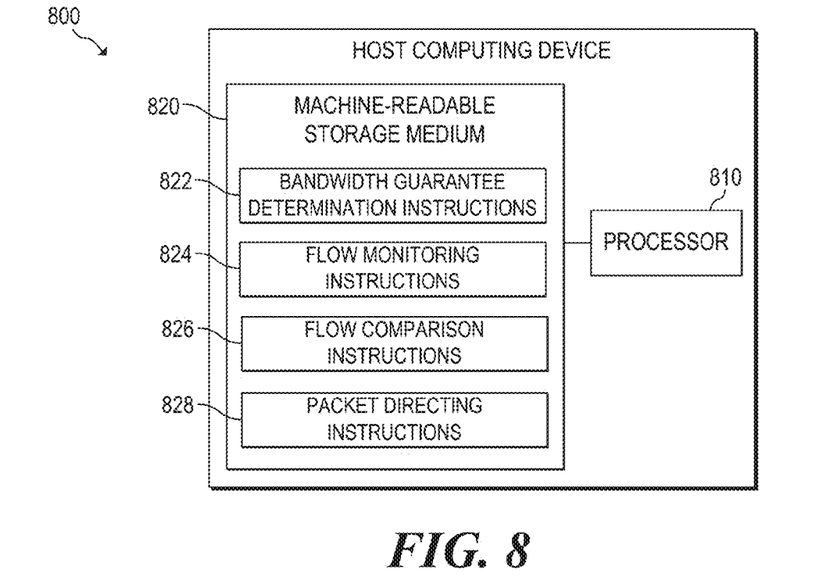
FIG. 8 is a block diagram of a host computing device for work conserving bandwidth guarantees using priority.

FIG. 8 is a block diagram of a host computing device 800 for work conserving bandwidth guarantees using priority. Host computing device 800 may be any computing system or computing device that is capable of communicating with other computing devices via a network, and is capable of running virtual machines. More details regarding various host computing devices may be described above, for example, with respect to host computing devices 102, 104, 106, 202, 204, 206 of FIGS. 1 and 2. In the embodiment of FIG. 8, host computing device 800 includes a processor 810 and a machine-readable storage medium 820.

Processor 810 may be one or more central processing units (CPUs), microprocessors, and/or other hardware devices suitable for retrieval and execution of instructions stored in machine-readable storage medium 820. Processor 810 may run various components and/or modules of a host computing device, for example, a hypervisor (e.g., 116) and a number of virtual machines (e.g., 110, 112, 114). In the particular embodiment shown in FIG. 8, processor 810 may fetch, decode, and execute instructions 822, 824, 826, 828 to perform work conserving bandwidth guarantees using priority. As an alternative or in addition to retrieving and executing instructions, processor 810 may include one or more electronic circuits comprising a number of electronic components for performing the functionality of one or more of instructions in machine-readable storage medium 820 (e.g., instructions 822, 824, 826, 828). With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 820 may be any electronic, magnetic, optical, or other physical storage device that stores executable instructions. Thus, machine-readable storage medium 820 may be, for example, Random Access Memory (RAM), an Electrically-Erasable Programmable Read-Only Memory (EEPROM), a storage drive, an optical disc, and the like. Machine-readable storage medium 820 may be disposed within host computing device 800, as shown in FIG. 8. In this situation, the executable instructions may be "installed" on the device 800. Alternatively, machine-readable storage medium 820 may be a portable (e.g., external) storage medium, for example, that allows stage computing device 800 to remotely execute the instructions or download the instructions from the storage medium. In this situation, the executable instructions may be part of an "installation package". As described herein, machine-readable storage medium 820 may be encoded with executable instructions for contextual-based localization based on manual testing.

Bandwidth guarantee determination instructions 822 may determine VM pair bandwidth guarantees between the source VM and at least one destination VM, e.g., including a first VM pair bandwidth guarantee between the source VM and a first destination VM. Flow monitoring instructions 824 may monitor outbound network traffic flow from the source VM to the first destination VM. Flow comparison instructions 826 may compare the flow to the first VM pair bandwidth guarantee. Packet directing instructions 828 may direct (e.g., route and/or tag) packets of the flow as being guaranteed traffic when the flow is less than the first VM pair bandwidth guarantee, and otherwise may direct (e.g., route and/or tag) packets of the flow as being work conserving traffic.

Figure 9:
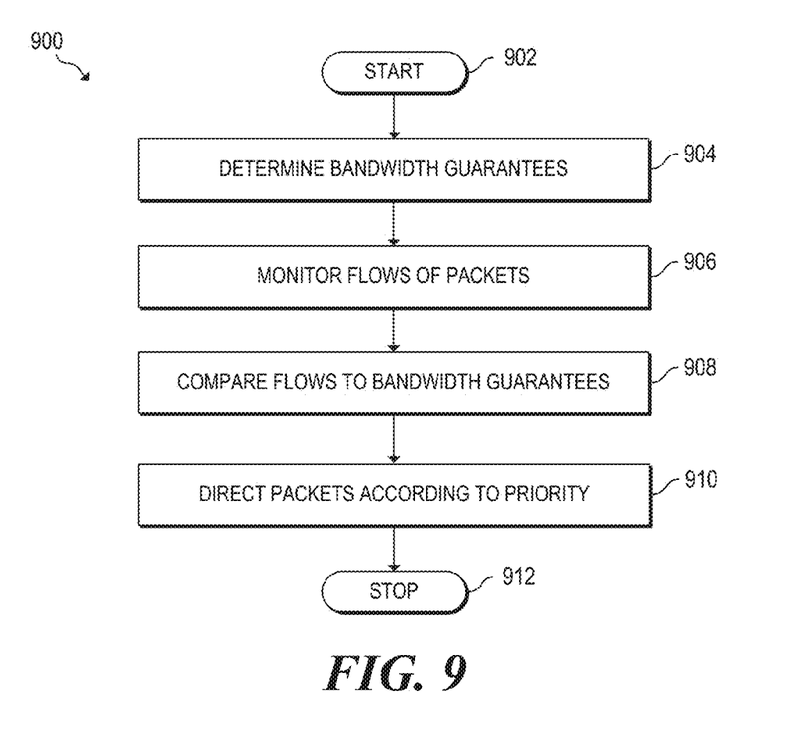
FIG. 9 is a flowchart of an example method for work conserving bandwidth guarantees using priority.

FIG. 9 is a flowchart of an example method 900 for work conserving bandwidth guarantees using priority. Method 900 may be described below as being executed or performed by host computing device 800; however, other suitable host computing devices may be used as well, for example, host computing devices 102, 104, 106, 202, 204, 206 of FIGS. 1 and 2. Method 900 may be implemented in the form of executable instructions stored on a machine-readable storage medium, such as storage medium 820, and/or in the form of electronic circuitry. In alternate embodiments of the present disclosure, one or more steps of method 900 may be executed substantially concurrently or in a different order than shown in FIG. 9. In alternate embodiments of the present disclosure, method 900 may include more or less steps than are shown in FIG. 9. In some embodiments, one or more of the steps of method 900 may, at certain times, be ongoing and/or may repeat.

Method 900 may start at step 902 and continue to step 904, where host computing device 800 may determine VM-to-VM bandwidth guarantees between the source VM and at least one destination VM, e.g., including a first VM-to-VM bandwidth guarantee between the source VM and a first destination VM. At step 906, host computing device 800 may monitor outbound network traffic flow from the source VM to the first destination VM. At step 908, host computing device 800 may compare the flow to the first VM-to-VM bandwidth guarantee. At step 910, host computing device 800 may direct (e.g., route and/or tag) packets of the flow according to a first priority when the outbound network traffic flow is less than the first VM-to-VM bandwidth guarantee. Host computing device 800 may direct 9 e.g., route and/or tag) packets of the flow according to a second priority when the flow is greater than the first VM-to-VM bandwidth guarantee. Method 900 may eventually continue to step 912, where method 900 may stop.

The invention claimed is:

1. A method for work conserving bandwidth guarantees using priority, the method comprising:
   determining VM-to-VM bandwidth guarantees between a source virtual machine (VM) and at least one destination VM, including a particular VM-to-VM bandwidth guarantee between the source VM and a particular destination VM;
   monitoring, with a processor, an outbound network traffic from the source VM to the particular destination VM;
   comparing the outbound network traffic to the particular VM-to-VM bandwidth guarantee;
   when the outbound network traffic is less than the particular VM-to-VM bandwidth guarantee, directing packets of the outbound network traffic according to a first priority in a main queue;
   when the outbound network traffic is greater than the particular VM-to-VM bandwidth guarantee, directing packets of the outbound network traffic according to a second priority;
   directing opportunistic traffic that is responsive to network congestion to a first queue; and
   directing opportunistic traffic that is unresponsive to network congestion to a second queue, wherein a packet in the first queue and in the second queue is directed to the outbound network traffic according to the second priority.

2. The method of claim 1, wherein directing packets of the outbound network traffic causes a packet of the main queue to travel at a rate up to the particular VM-to-VM bandwidth guarantee, and causes packets of the second priority to travel only when spare bandwidth exists in a network that connects the source VM and the at least one destination VM.

3. The method of claim 1, wherein the source VM is hosted by a first computing device and the particular destination VM is hosted by a second computing device, and wherein a hardware switch connects the first computing device and the second computing device.

4. The method of claim 1, wherein the source VM and the at least one destination VM are in communication with each across a network, and wherein directing packets of the outbound network traffic according to either the first priority or the second priority allows spare bandwidth capacity beyond the VM-to-VM bandwidth guarantees to be used.

5. The method of claim 3, wherein a monitoring, a comparing, and a directing occurs in a hypervisor of the first computing device.

6. The method of claim 3, wherein a monitoring, a comparing, and a directing occurs in the source VM, and wherein the source VM uses a multi-path transport protocol, where a first virtual path is associated with the first priority and a second virtual path is associated with the second priority.

7. The method of claim 6, wherein the source VM uses a first network interface or address to direct packets of the outbound network traffic according to the first priority, and a second network interface or address to direct packets of the outbound network traffic according to the second priority.

8. The method of claim 2, further comprising:
   analyzing the outbound network traffic that is less than the particular VM-to-VM bandwidth guarantee to determine that the outbound network traffic is from a premium tenant or application; and
   further directing packets of the outbound network traffic according to a premium priority, wherein directing packets of the outbound network traffic with the premium priority causes those packets to travel with a lower latency than packets that are associated with the first priority but not with the premium priority.

9. The method of claim 2, further comprising:
   analyzing the outbound network traffic that is greater than the particular VM-to-VM bandwidth guarantee to determine whether a transport protocol used to transmit the outbound network traffic is responsive to network congestion; and
   further directing packets of the outbound network traffic according to a third priority when the transport protocol is not responsive to network congestion, wherein directing packets of the outbound network traffic with the third priority causes those packets to travel only after packets associated only with the second priority.

10. A host computing device for work conserving bandwidth guarantees using priority, the host computing device comprising:
    at least one processor to:
    determine VM pair bandwidth guarantees between a source virtual machine (VM) and at least one destination VM, including a particular VM pair bandwidth guarantee between the source VM and a particular destination VM;
    monitor, in the host computing device, an outbound network traffic from the source VM to the particular destination VM;
    compare the outbound network traffic to the particular VM pair bandwidth guarantee;
    direct packets of the outbound network traffic as being guaranteed traffic when the outbound network traffic is less than the particular VM pair bandwidth guarantee according to a first priority and a second priority lower than the first priority, and otherwise direct packets of the outbound network traffic as being work conserving bandwidth;
    direct opportunistic traffic that is responsive to network congestion to a first queue; and
    direct opportunistic traffic that is unresponsive to network congestion to a second queue, wherein a packet in the first queue and in the second queue is directed to the outbound network traffic according to the second priority.

11. The host computing device of claim 10, wherein the at least one processor is further to rate limit the guaranteed traffic according to the particular VM pair bandwidth guarantee.

12. The host computing device of claim 10, wherein to direct packets of the outbound network traffic as being guaranteed traffic, the source VM is configured to route such packets over a first virtual path, and otherwise routes packets of the outbound network traffic over a second virtual path, wherein the first virtual path and the second virtual path are implemented using a multi-path transport protocol.

13. A machine-readable storage medium encoded with instructions executable by at least one processor of a host computing device for work conserving bandwidth guarantees using priority, the machine-readable storage medium comprising:

instructions to determine virtual machine (VM) pair bandwidth guarantees respectively for network traffic flows between multiple VMs in a network;

instructions to monitor the network traffic between the multiple VMs;

instructions to compare the network traffic to the respective VM pair bandwidth guarantees;

instructions to direct packets of the network traffic to prioritize portions of network traffic that are below their respective bandwidth guarantees according to a first priority or to a second priority lower than the first priority, and to allow remaining portions of network traffic to travel through the network when the network traffic is below its respective bandwidth guarantee;

instructions to direct opportunistic traffic that is responsive to network congestion to a first queue; and instructions to direct opportunistic traffic that is unresponsive to network congestion to a second queue, wherein a packet in the first queue and in the second queue is directed to the network traffic according to the second priority.

* * * * *